United States Patent
Huang et al.

(10) Patent No.: US 7,138,358 B2
(45) Date of Patent: *Nov. 21, 2006

(54) CATALYZED DIESEL PARTICULATE MATTER FILTER WITH IMPROVED THERMAL STABILITY

(75) Inventors: Yinyan Huang, Framingham, MA (US); Zhongyuan Dang, Canton, MA (US); Amiram Bar-llan, Brookline, MA (US)

(73) Assignee: Sud-Chemie Inc., Louisville, KY (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/653,745

(22) Filed: Aug. 29, 2003

(65) Prior Publication Data

US 2004/0116285 A1    Jun. 17, 2004

Related U.S. Application Data

(63) Continuation-in-part of application No. 10/008,142, filed on Nov. 13, 2001, now Pat. No. 6,613,299.

(51) Int. Cl.
- B01J 23/00 (2006.01)
- B01J 21/00 (2006.01)
- B01J 20/00 (2006.01)

(52) U.S. Cl. ............ 502/326; 502/242; 502/247; 502/252; 502/261; 502/262; 502/263; 502/309; 502/312; 502/313; 502/327; 502/328; 502/332; 502/333; 502/334; 502/339; 502/341; 502/349; 502/350; 502/351; 502/354; 502/355; 502/407; 502/415; 502/439; 502/527.12; 502/527.13

(58) Field of Classification Search ........ 502/242, 502/247, 252, 261–263, 309, 312, 313, 326–328, 502/332, 333, 334, 339, 341, 349, 350, 351, 502/354–355, 407, 415, 439, 527.12, 527.13
See application file for complete search history.

(56) References Cited

U.S. PATENT DOCUMENTS

| | | | |
|---|---|---|---|
| 3,223,653 A | 12/1965 | Stiles | |
| 3,257,163 A | 6/1966 | Stiles | |

(Continued)

FOREIGN PATENT DOCUMENTS

| EP | 0 734 756 | 10/1996 |
|---|---|---|

Primary Examiner—Cam N. Nguyen
(74) Attorney, Agent, or Firm—Scott R. Cox; Joan L. Simunic

(57) ABSTRACT

A catalyzed diesel particulate matter exhaust filter with improved diesel particulate matter oxidation activity and thermal stability including a porous filter substrate for filtering the diesel particulate matter washcoated with high surface area support alumina, titania, silica and zirconia promoted with one of ceria, lanthanum oxide, tungsten oxide, molybdem oxide, tin oxide for catalytic materials which includes an alkaline earth metal vanadate, and a precious metal

23 Claims, 3 Drawing Sheets

U.S. PATENT DOCUMENTS

| | | |
|---|---|---|
| 4,477,417 A | 10/1984 | Domesle |
| 4,510,265 A | 4/1985 | Hartwig |
| 4,515,758 A | 5/1985 | Domesle |
| 4,588,707 A | 5/1986 | Domesle |
| 4,617,289 A | 10/1986 | Saito |
| 4,711,870 A | 12/1987 | Yamada |
| 4,759,918 A | 7/1988 | Homeier |
| 4,828,807 A | 5/1989 | Domesle |
| 4,900,517 A | 2/1990 | Domesle |
| 4,902,487 A | 2/1990 | Cooper |
| 5,000,929 A | 3/1991 | Horiuchi |
| 5,100,632 A | 3/1992 | Dettling |
| 5,106,802 A * | 4/1992 | Horiuchi et al. ............... 502/65 |
| 5,157,007 A | 10/1992 | Domesle |
| 5,213,781 A | 5/1993 | Abe |
| 5,221,484 A * | 6/1993 | Goldsmith et al. ......... 210/650 |
| 5,292,704 A * | 3/1994 | Lester ........................ 502/309 |
| 5,294,411 A | 3/1994 | Breuer |
| 5,330,945 A | 7/1994 | Beckmeyer |
| 5,340,548 A | 8/1994 | Abe |
| 5,399,324 A * | 3/1995 | Subramanian et al. ... 423/213.7 |
| 5,514,354 A | 5/1996 | Domesle |
| 5,746,989 A | 5/1998 | Murachi |
| 5,753,582 A * | 5/1998 | Garcin et al. ................ 502/323 |
| 5,827,489 A * | 10/1998 | Garcin et al. ............ 423/239.1 |
| 5,884,474 A | 3/1999 | Topsoe |
| 5,911,961 A * | 6/1999 | Horiuchi et al. ......... 423/213.5 |
| 6,013,599 A | 1/2000 | Manson |
| 6,057,259 A * | 5/2000 | Miyadera et al. ........... 502/312 |
| 6,093,378 A * | 7/2000 | Deeba et al. ............ 423/213.5 |
| 6,110,860 A | 8/2000 | Inoue |
| 6,120,747 A * | 9/2000 | Sugishima et al. ...... 423/240 S |
| 6,143,687 A * | 11/2000 | Imada et al. ................. 502/159 |
| 6,410,793 B1 * | 6/2002 | Wachs .......................... 568/21 |
| 6,753,294 B1 * | 6/2004 | Brisley et al. ............... 502/439 |
| 6,777,370 B1 * | 8/2004 | Chen ......................... 502/241 |

\* cited by examiner

CATALYZED DIESEL PARTICULATE MATTER FILTER WITH IMPROVED THERMAL STABILITY

CROSS-REFERENCE TO RELATED APPLICATIONS

The present application is a continuation in part to U.S. patent application Ser. No. 10/008,142, filed Nov. 13, 2001 now U.S. Pat. No. 6,613,299, currently pending, and incorporated in its entirety by reference.

BACKGROUND OF INVENTION

The present development is a catalyzed diesel particulate matter exhaust filter with improved thermal stability and improved diesel particulate matter oxidation activity. The catalyzed filter comprises a porous filter substrate for filtering the diesel particulate matter washcoated with high surface area support. Exemplary supports comprise alumina, titania, silica, zirconia or a combination thereof promoted with ceria, lanthanum oxide, tungsten oxide, molybdem oxide, tin oxide or a combination thereof. The catalytic materials of the filter can include an alkaline earth metal vanadate and a precious metal.

Internal combustion engines function by burning fuels (hydrocarbons) at high temperatures. In theory, the products of the combustion process are $CO_2$ and water. But, it is not uncommon that the combustion process is incomplete resulting in the formation of undesirable byproducts are formed such as carbon monoxide, hydrocarbons and soot. Other reactions occurring in internal combustion engines include the oxidation of nitrogen molecules to produce nitrogen oxides and the oxidation of sulfur to form $SO_2$ and small percentage of $SO_3$. Further, when the temperature decreases, the $SO_3$ can react with $H_2O$ to form sulfuric acid. Other inorganic materials are formed as ash. The products of these reactions result in undesirable gaseous, liquid and solid emissions from internal combustion engine: gaseous emissions—carbon monoxide, hydrocarbons, nitrogen oxides, sulfur dioxide; liquid phase emissions—unburned fuel, lubricants, sulfuric acid; and, solid phase emissions—carbon (soot). The combination of liquid phase hydrocarbons, solid phase soot and sulfuric acid results in the formation of small size droplets often called total particulate matter.

The most common types of internal combustion engines are diesel engines and Otto engines. Compared with Otto engines, diesel engines emit more particulate matter and pose a greater threat to air quality and to the health of human beings. To reduce these risks, tremendous efforts have been made for the control of diesel particulate emissions. One well known approach is to use filters to trap exhaust particulate matter. These filters are generally made of porous, solid materials having a plurality of pores extending therethrough and small cross-sectional sides, such that the filter is permeable to the exhaust gas which flows through the filter and yet capable of restraining most of all of the particulate materials. As the mass of collected particulate material increases in the filter, the flow of the exhaust gas through the filter is gradually impeded, resulting in an increased backpressure within the filter and reduced engine efficiency.

Conventionally, when the backpressure reaches a certain level, the filter is either discarded, if it is a replaceable filter, or removed and regenerated by burning the collected particulate materials off at temperatures of from about 600° C. to about 650° C. so the filter can be reused. Regeneration of filters in situ can sometimes be accomplished by periodically enriching the air fuel mixture. The enrichment produces a higher exhaust gas temperature. The high exhaust temperature burns off the particulate materials contained within the filter.

Thermal regeneration of diesel particulate filter at temperatures above 600° C. is not generally desirable because it can lead to uncontrolled lightoff of soot, temperature overshoot and damage of the filter substrates. In addition, thermal regeneration consumes large amounts of energy. Rather, regeneration of diesel particulate filters at lower temperature is preferred. Such regeneration can be accomplished with the assistance of catalysts. For example, U.S. Pat. Nos. 5,100,632 and 4,477,417 each teach a catalyzed filter that will regenerate at temperatures lower than 600° C.

Several patents teach compositions for diesel exhaust particulate filters. Many of the compositions use a combination of particular vanadium compounds with a platinum compound. For example, U.S. Pat. No. 4,510,265 discloses a coated diesel particulate filter formed by coating a solution comprising a platinum group metal and a silver vanadate onto a ceramic monolithic support material. Another diesel exhaust particulate filter is disclosed in U.S. Pat. No. 4,588,707 in which a catalytically active substance formed from lithium oxide, copper chloride, a vanadium oxide/alkaline metal oxide combination or precious metal is coated onto a filter substrate.

U.S. Pat. No. 5,514,354 teaches an open cell monolithic catalyst for the purification of diesel exhaust gases. The monolith is coated with oxides containing vanadium and platinum group metals as active components U.S. Pat. No. 6,013,599 discloses a diesel particulate filter which can be regenerated in situ, which is formed from a porous refractory support material onto which washcoating is secured. The washcoating in one embodiment is formed by mixing an acidic iron-containing compound and a copper-containing compound, adding an aqueous alkaline metal salt solution and an acidic vanadium-containing compound and finally adding to the mixture an alkaline earth metal compound slurry.

While these patents disclose a number of different compositions of material for use as filters for diesel particulate matter, there are still significant problems associated with the increased pressure drop experienced during use of these filters. Furthermore, the thermal stability of the catalysts decrease with increasing temperature if the catalysts are directly coated on to low surface area substrates. The catalysts sinter and deactivate at high temperature during regeneration. In addition, some of the diesel combustion catalysts do not have good sulfur poison resistance and can be deactivated at high temperature.

SUMMARY OF INVENTION

The present invention is a catalyzed diesel particulate exhaust filter comprising a porous filter substrate washcoated with a high surface support. The support is preferably promoted with lanthanum oxide, ceria, tungsten oxide, tin oxide or a combination thereof. The promoted support is also preferably impregnated with an alkaline earth metal vanadate, preferably magnesium, calcium or barium vanadate, and a precious metal, preferably platinum. A process for forming the diesel particulate matter exhaust filter is also taught as is a method of filtering particulate matter from the diesel exhaust using a diesel exhaust filter.

DETAILED DESCRIPTION OF A PREFERRED EMBODIMENT

Figure 1:
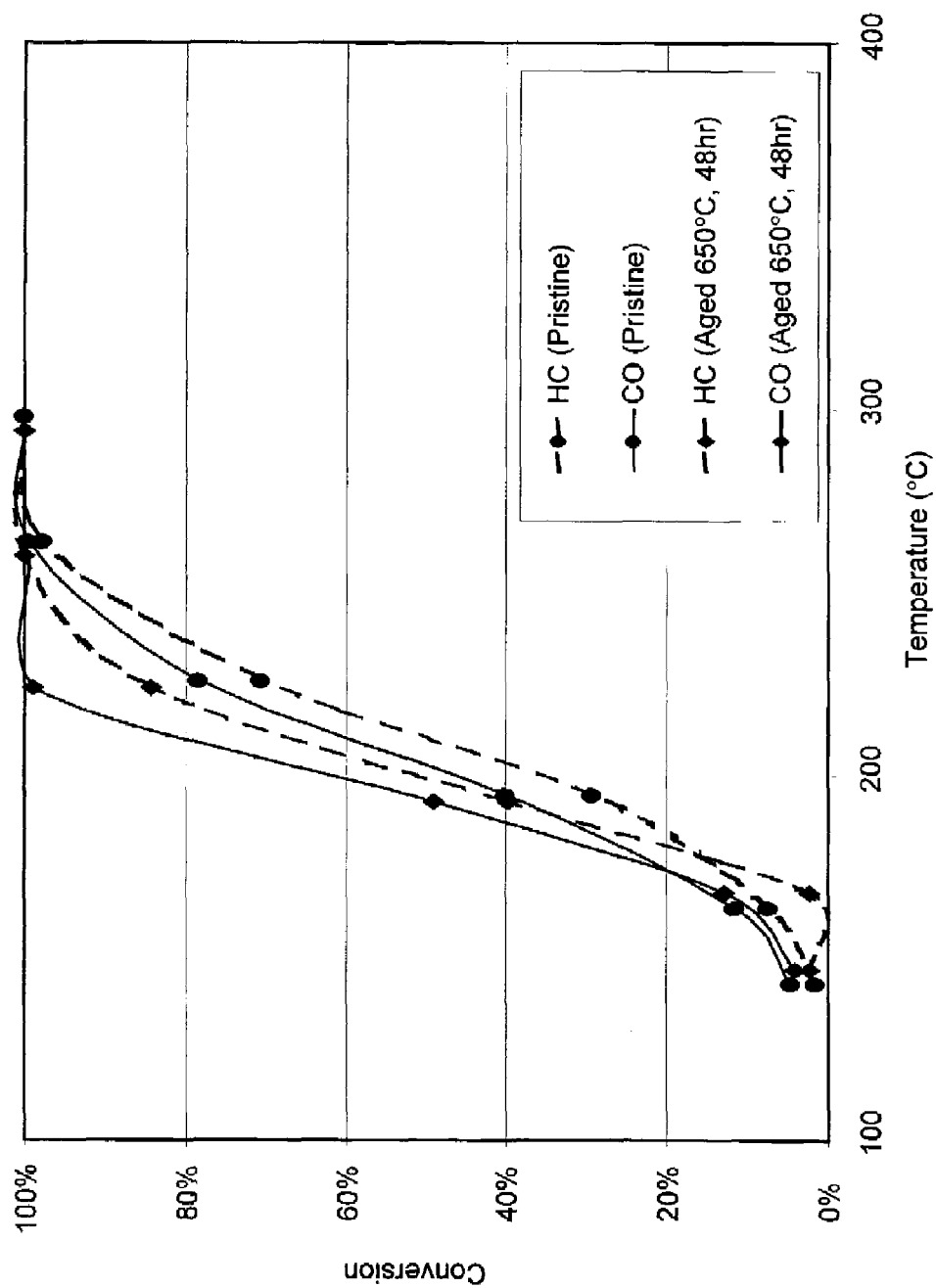
FIG. 1 is a graph depicting the activity of the invention catalyst for gas phase oxidation of carbon monoxide and propylene under the conditions of 700 ppm CO, 300 ppm $C_3H_6$, 100 ppm $SO_2$, 4% $H_2O$ and 30,000/h GHSV.

This invention relates to a catalyzed diesel particulate matter exhaust filter for use with diesel exhaust. In the practice of the invention, the catalyzed diesel particulate matter exhaust filter is placed in a filter housing mounted in an exhaust gas handling system of a diesel engine. The filter and filter housing, along with any other gas line elements which may be present, are placed between the exhaust gas manifold of the engine and the end of the exhaust pipe, which pipe is open to the atmosphere, preferably, the filter is as close as possible to the engine exhaust manifold so that the exhaust gases, which are at high temperature, can be used to burn off filtered particulate matter trapped by the filter and to continuously regenerate the filter. Placed in the filter housing is the catalyzed diesel particulate matter exhaust filter of the present invention.

The catalyzed diesel particulate matter exhaust filter is comprised of a porous filter substrate for filtering the diesel particulate matter from the exhaust stream, coated with a catalytic material. The porous filter substrate is formed from a conventional filtering product, such as a thin, porous walled honeycomb, monolith of foam structure though which the exhaust gases can pass to be filtered. Preferably, the filter substrate has a significant flow through capacity so as not to prevent or restrict significantly the flow of exhaust gases through the filter substrate. However, it must also contain sufficiently convoluted passageways to cause the particulate matter which is present in the diesel exhaust gas to drop out of the exhaust gas stream and be retained by filter substrate.

The filter substrate may be produced, for instance, from conventional filter materials, such as alumina, titania, zirconia, silica, magnesia, potassium tatanate, silica-alumina, silica-zirconia, titania-zirconia, titania-silica, silicon carbide, silicon nitride, ceramic cordierite, mullite and mixtures and combinations thereof. Preferably substrates are formed from ceramic materials and silicon carbide materials.

The porous filter substrate is washcoated with high surface area support. The high surface support washcoating will lead to high dispersion of the catalytic material afterwards and high thermal stability of the catalytic material. The washcoat material is preferably formed from alumina, titania, zirconia, titania-silica, zeolite, and mixtures and combinations thereof. Alumina is preferred since it has high surface area and low cost. However, alumina has low resistance to sulfur poison. Moreover, when Mg is used as a component of the catalytic material, alumina reacts with magnesium to form magnesium aluminate spinel structure and it results in the loss of surface area and catalyst deactivation. Titania is the most preferable since it has high surface area and high resistance to poison resistance.

The high surface area supports are preferably modified by tungsten oxide, molybdem oxide, lanthanum oxide, ceria, to enhance the thermal stability of the supports and to promote the activity of the catalytic material for diesel particulate matter oxidation. Modification of high surface area support is preferred with the process of pre-stabilization, i.e., the high surface area support are doped with the modification components before washcoating, since it results in feasible washcoating processing. Some of the doped high surface area supports are commercially available. With the use of titania support, tungsten oxide is favored for high dispersion of tungsten oxide on titania, strong enhancement of titania surface area and strong enhancement of activity of the catalytic material. Typically, the weight percentage of tungsten oxide in doped titania is in the range of 5–15% and preferably 9–10% since it is close to monolayer dispersion capacity.

The washcoated porous filter substrate is impregnated with the catalytic material. The catalytic material is preferably from a combination of an alkaline earth metal vanadate and a precious metal. Any alkaline earth metal can be combined with vanadium to form the alkaline earth metal vanadate although magnesium vanadate, calcium or barium vanadates are preferred with magnesium vanadate the most preferred. While magnesium oxides is utilized with vanadium oxide, the preferred ratio of vanadium oxide to magnesium oxide is from about 1:1 to about 1:10, preferably from about 1:1 to about 1:5.

The second component of the catalytic material is the precious metal. The precious metal is selected from the group consist of platinum, palladium, rhodium, ruthenium, rhenium and osmium. The preferred precious metal are platinum, palladium and rhodium, the most preferred being platinum.

The preferred ratio of platinum to the alkaline earth vanadate which is impregnated on the washcoated filter is from 1:1 to 1:50, preferably from 1:5 to about 1:20, and most preferably about 1:10, with the ratio measured by weight. In computing this ratio, the weight of the alkaline earth metal and vanadium oxides, if any, are included with the alkaline earth vanadates. All measurements are by weight after coating of the filter substrate.

Washcoating high surface area support onto the walls of filter substrate, such as monolithic ceramic material, a foamed ceramic material or a silicon carbide material, can be carried out in a conventional process. For example, the high surface area support material in powder form is first made into a slurry by mixing the powder with water, and optionally, with acid addition for acidity modification, followed by ballmill for certain time period to desired rehology. The filter substrate is then dipped into the washcoating slurry, followed by extra slurry removal with the use of air-knifing or vacuum suction. Once the extra slurry is removed, the coated filter substrate is dried at a temperature of 100–150° C. for about 2 hour followed by calcining at a temperature of about 500–600° C. for about 3 hours to secure the coating to the filter substrate.

Deposition of the catalyst material can also be carried out in a conventional process. For example, the filter substrate may be impregnated with the catalytic material. The preferred method for depositing the catalytic material on the filter is to impregnate the washcoated filter substrate with a catalytic material. In one preferred embodiment for impregnating the filter substrate with the catalytic material, an aqueous solution of salts of the alkaline earth metal and vanadium are first prepared. The washcoated filter substrate is contacted with the aqueous solution of the alkaline earth salt, such as magnesium nitrate or acetate and the vanadium salt, such as vanadium oxalate or citrate, or ammonium vanadate, and cured at a temperature of 500–600° C. for about 3 hours. In order to produce magnesium vanadate, the atomic ratio of the vanadium to the magnesium in the solution is preferably about 2:3. Well knows salts of other alkaline earth metals such as calcium or barium, may also be used to produce the alkaline earth vanadate.

Once the filter substrate is coated with the alkaline earth and vanadate salts, any excess salt solution is drained and the impregnated filter substrate is dried at a temperature of about 100–150° C. for about 2 hour, followed by calcination of the coated filter at a temperature of about 500° C. to 600° C. for about three hours to secure the magnesium vanadate onto the filter substrate.

Following impregnation of the washcoated filter substrate, with alkaline earth metal vanadate, a precious metal salt is then impregnated onto the coated filter substrate. In one preferred embodiment, this is accomplished by bringing the alkaline earth metal vanadate coated filter substrate into contact with an aqueous solution of the precious metal salt. For example, when the precious metal chosen is platinum, one preferred salt solution is platinum sulfite acid. The coated filter substrate is coated with the precious metal solution. It is then dried at a temperature of about 100–150° C. and calcined at about 500–600° C. for about three hours.

Impregnation of the filter substrate with the alkaline earth metal, the vanadium metal and the precious metal compound can also be contacted in a one step process. When the filter substrate is impregnated with the appropriate materials in a one step process, the preferred process is to first form an aqueous solution containing an alkaline earth metal salt, a vanadium salt and a precious metal salt. For example, when magnesium is the alkaline earth metal, one preferred salt is magnesium acetate. One preferred vanadium salt for single step process is vanadium citrate. These two salts are mixed with the platinum compound, such as platinum sulfite acid. The filter is then dipped into the solution of these compounds and any extra liquid is removed by means of a conventional process, such as the use of vacuum suction. The coated filter substrate is then dried at a temperature of about 100–150° C. for about 2 hours, followed by calcining at a temperature of about 500–600° C. for about 3 hours to form the coated filter material.

Alternatively, the washcoating of high surface area support and depositing catalytic material can be conducted in one single step process. When the filter substrate coating is carried out in one step process, the powder of high surface area support, the salts of alkaline earth metal, vanadium and the precious metal, is mixed into aqueous slurry. The mixture slurry is ballmilled for about 3 to 8 hours to reach desirable rheology. The filter substrate is then dipped into the slurry and the extra slurry is the removed with the use of air-knifing or vacuum suction. The coated filter substrate is then dried at a temperature of about 100–150° C. and calcined at a temperature of 500–600° C. for about three hours.

In preparing the coated filter substrate, the washcoated high surface area support is preferably present on the filter substrate at a loading of 100 g/cf to 5000 f/cf and preferably, from 200 g/cf to 3000 g/cf, and most preferably 300–1000 g/cf.

In preparing the coated diesel particulate matter exhaust filter, the catalytic material is preferably present on the filter substrate at an alkaline earth metal vanadate loading of from 200 to about 1,000 g/cf (7.1 to 35.5 g/l), preferably 300 to 700 g/cf (10.7 to about 24.9 g/l) and most preferably about 500 g/cf (17.8 g/l), and a precious metal loading of about 20 to about 100 g/cf (0.7 to 3.6 g/l) and the most preferably about 25 g/cf (0.9 g/l). The total catalyst material loading on the filter substrate is from about 200 g/cf to about 1000 g/cf (7.1–35.5 g/l). Preferably the ratio of the platinum to the magnesium vanadate is about 1:1 to about 1:50, more preferably from about 1:5 to about 1:20 and most preferably about 1:10.

Many of the prior art exhaust filters for diesel particulate matter use a washcoating process to coat the filter substrate with the active catalytic material. It has been surprisingly discovered that the coating of diluted slurry followed by impregnation of the catalytic material results in reduced bask pressure drop as results of reduced pore blockage. It has also been surprisingly discovered that when the preparation method of the present invention is utilized, there is almost no pressure drop increase with a loading of washcoating up to 1000 g/cf and a catalytic material loading up too 500 g/cf. In comparison, there are pressure drop increase of about 100% with catalyst loading of up to about 480 g/cf using washcoating process of U.S. Pat. No. 6,013,599 and about 260% pressure drop increase with a catalyst loading of about 1030 g/cf.

It has also been surprisingly discovered that when the catalyst of the invention is utilized, the temperature for effective regeneration of the catalyst is reduced significantly. Presence of high surface area supports enhances the dispersions of the catalytic materials. It results in more active sites for oxidation of particulate matter. When uncatalyzed porous filter substrate is regenerated, the lightoff temperature of the particulate matter on the filter substrate is in the range of 500–600° C. When the catalytic material is coated onto the filter substrate by means of direct impregnation, the regeneration of the loaded filter substrate takes place at a temperature of about 380° C. In contrast, the regeneration of the exhaust filter of the invention takes place at temperature as low as 350° C. As the temperature of a typical diesel engine exhaust can reach this temperature during normal operations, partial or even complete regeneration can occur during normal operations. A reduction of the temperature of regeneration of this extent is a significant improvement over the prior art.

It has also been surprisingly discovered that the catalyst of the invention has superior thermal stability to the catalyst that is prepared by direct impregnation. Presence of high surface area support washcoating enhances the thermal stability of catalytic material. For catalyzed diesel particulate filter substrate formed by means of direct impregnation, being aged at 650° C. for 48 hours results in significant sintering the catalyst and deactivation. For gas phase reaction of carbon monoxide and propylene as carried out on lab bench reactor, the lightoff temperature (50% conversion) is 222° C. for carbon monoxide and 231° C. for propylene. The highest propylene conversion reaches only 90%. After aging at 650° C. for 48 hours, the light off temperature becomes 226° C. for CO and 236° C. for propylene. The highest conversions of carbon monoxide and propylene are about 87% even at above 400° C. In comparison, the catalytic material of the invention has light off temperature of 204° C. for carbon monoxide and 212° C. for propylene and the light off temperature is 195° C. for carbon monoxide and 198° C. for propylene after aging at 650° C. for 48 hour. Complete conversion of carbon monoxide and propylene is reached at about 275° C.

EXAMPLE 1

The Invention

Tungsten doped titania containing about 9.5% $WO_3$ is obtained from Millennium Inorganic Chemicals Company. 15 kg of the titania is mixed with 35 liter of water and milled for about three hours. The resulting slurry is then diluted to about a 10–15% solid content. A Corning cordierite ceramic monolith diesel particulate filter element (EX-80, 5.66 inch diameter and 6 inch length, 200 cells per square inch) is dipped into the slurry for about 30 second. The extra slurry is removed by means of airknifing or vacuum suction. The coated substrate is then dried at 100–125° C. for about two hours, calcined at 550° C. for three hours and then cooled down to ambient temperature. The total titania loading is about 500 g/cf.

The washcoated cordierite substrate is then dipped into 500 ml of an aqueous solution containing 15 g/l of magnesium in the form of magnesium nitrate, 20 g/l of vanadium in the form of vanadium oxalate. After impregnation, the extra liquid is removed from the filter element by vacuum suction. Following impregnation, the filter element is dried at 125° C. for about 2 hours and then calcined at 550° C. for approximately 3 hours. The magnesium vanadate loading is 300 grams per cubic foot (10.6 g/l).

After cooling down to ambient temperature, the filter element is dipped into a 500 ml aqueous solution of platinum sulfite acid ($H_4Pt(SO_3)_4$) containing 5 g/l platinum. Extra liquid is removed by vacuum suction. Following impregnation, the coated filter element is dried at 125° C. for about 2 hours and calcined at 550° C. for about three hours. The platinum loading on a by weight basis is 25 grams per cubic foot (0.8 g/l).

A core of the filter element having a diameter of 1.75" and a length of 6" with a titania washcoat loading of 500 g/cf, a magnesium vanadate loading of 300 g/cf and a platinum loading of 25 g/cf is removed from the full size element and tested for gas phase oxidation reaction of carbon monoxide and propylene in a bench reactor. The testing conditions are 700 ppm CO, 300 ppm propylene, 100 ppm $SO_2$, 4% $H_2O$ and 30,000/h GHSV. The activity is shown in FIG. 1. The lightoff temperature (50% conversion) is 204° C. for carbon monoxide and 212° C. for propylene. At above 275° C., conversion of carbon monoxide and propylene reaches 100%. After the testing, the catalyst core is aged at 650° C. for 48 hour. Then it is tested again under the same conditions. As shown in FIG. 1, there is no deactivation of the catalyst. The lightoff temperature is 195° C. for carbon monoxide and 198° C. for propylene. Conversion of carbon monoxide and propylene reaches 100% at above 275° C.

Alternatively, a core of the filter element having a diameter of 4.66" and a length of 6" with a titania washcoat loading of 500 g/cf, a magnesium vanadate loading of 300 g/cf and a platinum loading of 25 g/cf is removed from the full size element and tested for regeneration of diesel particulate meter using a Lister-Petter LPA2 0.726L 2-cylinder diesel engine powered 5.5 kW genset with fixed speed of 1800 rpm. The filter element is installed in a housing after the diesel engine exhaust manifold. The filter element is loaded with diesel particulate matter under conditions of 3 Kw loading for seven hours. After cooling down to ambient temperature, the engine is re-started and the engine load is increased by 1 Kw every 15 minute. The temperature of the exhaust and the pressure drop cross the filter element are recorded. As shown in the FIG. 3, the pressure drop increases with temperature at the beginning and then decreases with temperature when temperature is above 350° C., indicating that at about 350° C., diesel particulate matter buildup and oxidation reach equilibrium. Therefore, the engine balance point temperature is around 350° C. The tested diesel filter element is unloaded, calcined at 550° C. for a few hours to burn off residual diesel particulate matter, aged at 650° C. for 48 hours and then reloaded and tested again. The balance point temperature shows no change.

EXAMPLE 2

Comparative Sample

A Corning cordierite ceramic monolith diesel particulate filter element (EX-80, 5.66 inch diameter and 6 inch length, 200 cells per square inch) is dipped into 500 ml of an aqueous solution containing 15 g/l of magnesium in the form of magnesium nitrate, 20 g/l of vanadium in the form of vanadium oxalate. After impregnation, the extra liquid is removed from the filter element by vacuum suction. Following impregnation, the filter element is dried at 125° C. for 2 hours and then calcined at 550° C. for 3 hours. The magnesium vanadate loading is 300 grams per cubic foot (10.6 g/l). After cooling down to ambient temperature, the filter element is dipped into a 500 ml aqueous solution of platinum sulfite acid ($H_4Pt(SO_3)_4$) containing 5 g/l platinum. Extra liquid is removed by vacuum suction. Following impregnation, the coated filter element is dried at 125° C. for 2 hours and calcined at 550° C. for three hours. The platinum loading on a by weight basis is 25 grams per cubic foot (0.8 g/l)

Figure 2:
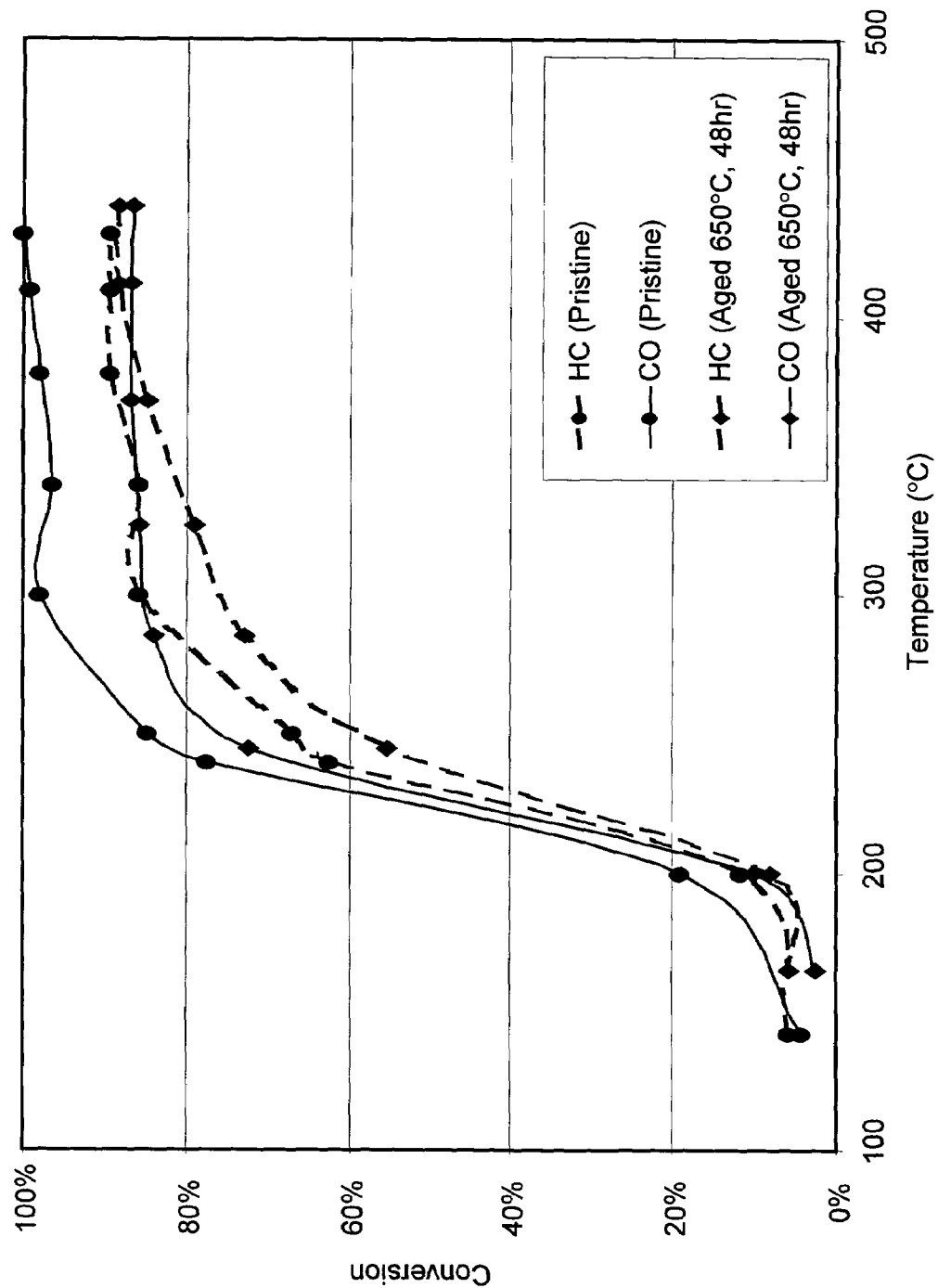
FIG. 2 is a graph depicting the activity of the comparative catalyst for gas phase oxidation of carbon monoxide and propylene under the conditions of 700 ppm CO, 300 ppm $C_3H_6$, 100 ppm $SO_2$, 4% $H_2O$ and 30,000/h GHSV.

A core of the filter element having a diameter of 1.75" and a length of 6" with a titania washcoat loading of 500 g/cf, a magnesium vanadate loading of 300 g/cf and a platinum loading of 20 g/cf is removed from the full size element and tested for gas phase oxidation reaction of carbon monoxide and propylene in lab bench reactor. The testing conditions are 700 ppm CO, 300 ppm propylene, 100 ppm $SO_2$, 4% $H_2O$ and 30,000/h GHSV. The activity is shown in FIG. 2. The lightoff temperature (50% conversion) is 222° C. for carbon monoxide and 231° C. for propylene. At above 400° C., the conversion of carbon monoxide is complete while the highest propylene conversion is only about 90%. After the testing, the catalyst core is removed from the reactor and aged at 650° C. for 48 hours. Then it is tested again under the same conditions. As further shown in FIG. 2, there is significant deactivation of the catalyst. The lightoff temperature is 226° C. for carbon monoxide and 236° C. for propylene. Conversion of carbon monoxide and propylene are not complete even at high temperature. The highest carbon monoxide conversion is about 87% at above 400° C. and the highest conversion of propylene is about 88%.

Figure 3:
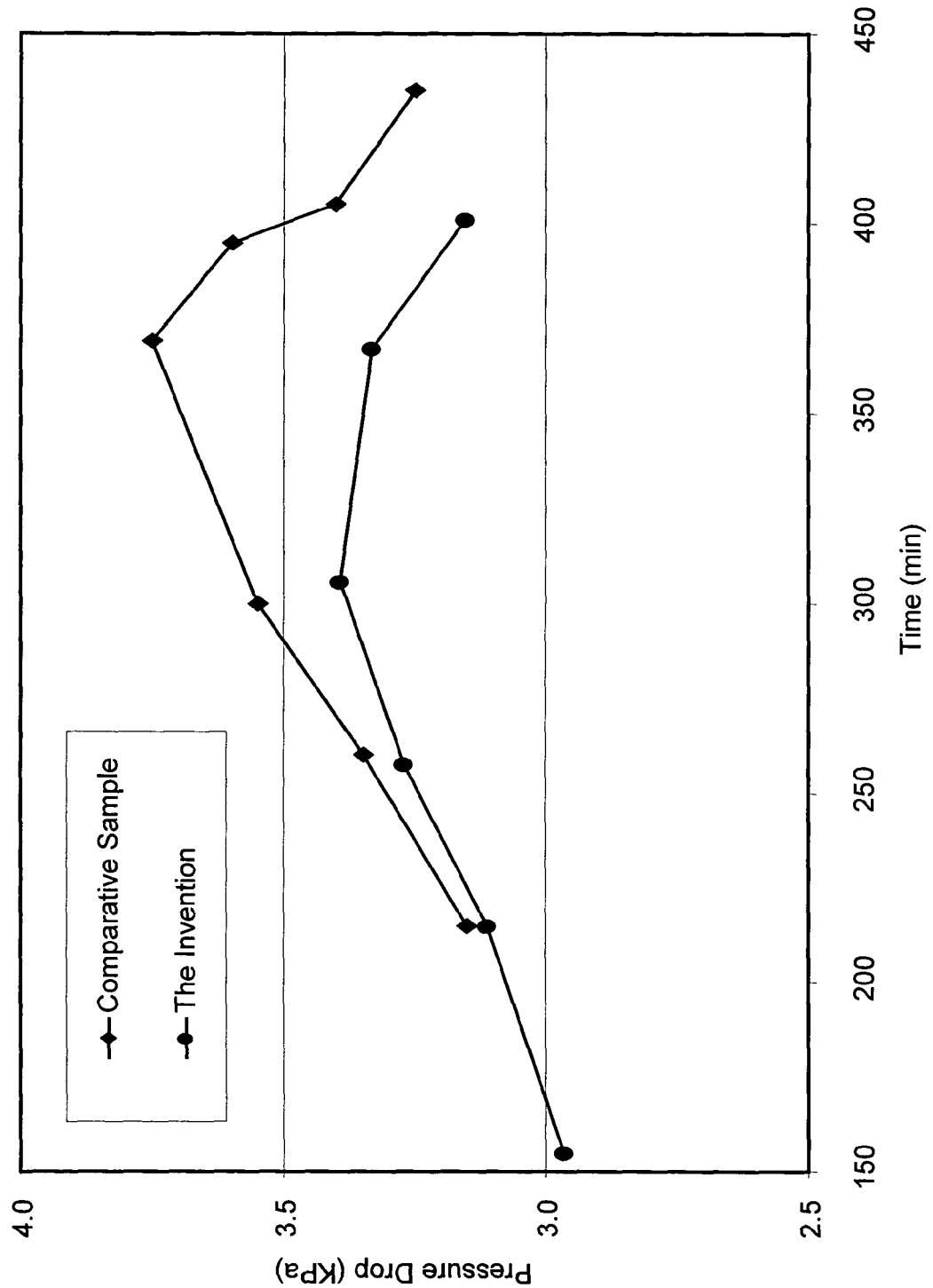
FIG. 3 is a graph depicting the activity of the invention catalyst and the comparative catalyst for the oxidation of diesel particulate matter tested on 5.5 KW Lister-Petter LPA2 diesel genset.

Alternatively, a core of the filter element having a diameter of 4.66" and a length of 6" with a titania washcoat loading of 500 g/cf, a magnesium vanadate loading of 300 g/cf and a platinum loading of 20 g/cf is removed from the full size element and tested for regeneration of diesel particulate meter using a Lister-Petter LPA2 0.726L 2-cylinder diesel engine powered 5.5 kW genset at the same conditions as used in Example 1. As shown in FIG. 3, the pressure drop increases with temperature at the beginning and then decreases with temperature when temperature is about 375° C., and the engine balance point temperature is around 375° C.

It is understood that modification, substitutions, omissions and changes of the specific embodiments may be made without departing from the spirit of the invention. The invention is intended to be encompassed by the following claims.

What is claimed is:

1. A catalyzed diesel particulate matter exhaust filter comprising a porous filter substrate for filtering the diesel particulate matter exhaust washcoated with a high surface area support, and impregnated with a catalyst, wherein the catalyst comprises an alkaline earth metal vanadate and a precious metal.

2. The exhaust filter of claim 1 wherein the high surface area support is alumina, silica, titania, zirconia, alumina-silica, titania-silica, or combinations thereof.

3. The exhaust filter of claim 1 wherein the high surface area support comprises tungsten doped titania.

4. The exhaust filter of claim 3 wherein the weight percentage of tungsten oxide doped in the titania is from about 5% to about 15%.

5. The exhaust filter of claim 1 wherein the precious metal is platinum, rhodium, palladium, ruthenium, rhenium, osmium or combinations thereof.

6. The exhaust filter of claim 1 wherein the alkaline earth metal is magnesium, calcium, barium or combinations thereof.

7. The exhaust filter of claim 6 wherein the alkaline earth metal is magnesium.

8. The exhaust filter of claim 1 wherein the weight ratio of the precious metal to the alkaline earth metal vanadate is from about 1:1 to about 1:50.

9. The exhaust filter of claim 1 wherein the porous filter substrate comprises cordierite, alumina, titania, zirconia, silica, magnesia, silicazirconia, silica-alumina, silicon carbides, mullites, or combinations thereof.

10. The exhaust filter of claim 1 wherein the quantity of high surface area support washcoating the filter substrate is from about 100 g/ft$^3$ to 2000 g/ft$^3$.

11. The exhaust filter of claim 1 wherein the high surface area support comprises titania.

12. The exhaust filter of claim 1 wherein the high surface area support is doped with a compound selected from the group consisting of tungsten oxide, molybdenum oxide, lanthanum oxide, ceria and combinations thereof.

13. The exhaust filter of claim 1 wherein the high surface area support is doped with a compound comprising tungsten oxide.

14. A catalyzed diesel particulate matter exhaust filter comprising a porous filter substrate for filtering the diesel particulate matter exhaust washcoated with a high surface area support at a concentration of from about 100 g/ft$^3$ to 2000 g/ft$^3$, and impregnated with a catalyst, wherein the catalyst comprises an alkaline earth metal vanadate and a precious metal having a weight ratio of precious metal to alkaline earth metal vanadate of from about 1:5 to about 1:20.

15. The exhaust filter of claim 14 wherein the high surface area support is alumina, silica, titania, zirconia, alumina-silica, titania-silica, or combinations thereof.

16. The exhaust filter of claim 14 wherein the precious metal is platinum, rhodium, palladium, ruthenium, rhenium, osmium or combinations thereof.

17. The exhaust filter of claim 14 wherein the alkaline earth metal is magnesium, calcium, barium or combinations thereof.

18. The exhaust filter of claim 14 wherein the high surface area support comprises titania.

19. The exhaust filter of claim 14 wherein the high surface area support is doped with a compound selected from the group consisting of tungsten oxide, molybdenum oxide, lanthanum oxide, ceria and combinations thereof.

20. The exhaust filter of claim 14 wherein the high surface area support is doped with a compound comprising tungsten oxide.

21. A catalyzed diesel particulate matter exhaust filter comprising a porous filter substrate for filtering the diesel particulate matter exhaust washcoated with tungsten doped titania, and impregnated with a catalyst comprising magnesium vanadate and platinum.

22. The exhaust filter of claim 21 wherein the weight percentage of tungsten oxide in doped titania is from about 5% to about 15%, and the weight ratio of the platinum to the magnesium vanadate is from about 1:1 to about 1:50.

23. The exhaust filter of claim 21 wherein the porous filter substrate comprises cordierite, alumina, titania, zirconia, silica, magnesia, silicazirconia, silicaalumina, silicon carbides, mullites, or a combination thereof.

* * * * *